(12) United States Patent
Wernow et al.

(10) Patent No.: US 11,769,525 B1
(45) Date of Patent: Sep. 26, 2023

(54) SEEK-INDUCED VIBRATION COMPENSATION

(71) Applicant: Seagate Technology LLC, Fremont, CA (US)

(72) Inventors: Josiah Wernow, Madison, WI (US); Evgeny Kharisov, Brooklyn, NY (US)

(73) Assignee: Seagate Technology LLC, Fremont, CA (US)

( * ) Notice: Subject to any disclaimer, the term of this patent is extended or adjusted under 35 U.S.C. 154(b) by 0 days.

(21) Appl. No.: 17/719,663

(22) Filed: Apr. 13, 2022

(51) Int. Cl.
*G11B 5/55* (2006.01)

(52) U.S. Cl.
CPC ......... *G11B 5/5547* (2013.01); *G11B 5/5552* (2013.01); *G11B 5/5565* (2013.01)

(58) Field of Classification Search
None
See application file for complete search history.

(56) References Cited

U.S. PATENT DOCUMENTS

| | | | |
|---|---|---|---|
| 5,402,400 A | 3/1995 | Hamada et al. | |
| 5,581,421 A * | 12/1996 | Aisawa | G11B 5/5547 318/696 |
| 6,504,670 B1 * | 1/2003 | Dittmar | G11B 5/5526 |
| 6,629,448 B1 * | 10/2003 | Cvancara | G01P 21/00 73/1.38 |
| 6,684,144 B2 | 1/2004 | Erickson et al. | |
| 6,937,423 B1 * | 8/2005 | Ngo | G11B 5/59694 360/77.02 |
| 7,023,640 B1 * | 4/2006 | Codilian | G11B 5/596 360/75 |
| 7,283,321 B1 * | 10/2007 | Sun | G11B 5/5552 |
| 7,375,916 B2 | 5/2008 | Semba et al. | |
| 7,460,329 B2 | 12/2008 | Sosseh et al. | |
| 7,580,217 B2 | 8/2009 | Abe et al. | |
| 7,595,953 B1 * | 9/2009 | Cerda | G11B 5/5582 360/77.04 |
| 7,724,457 B2 | 5/2010 | Dang et al. | |
| 2006/0072392 A1 * | 4/2006 | Semba | G11B 5/59627 369/53.18 |
| 2007/0030768 A1 * | 2/2007 | Semba | G11B 5/5582 |
| 2008/0158722 A1 * | 7/2008 | Abe | G11B 5/59622 360/78.04 |
| 2009/0268340 A1 * | 10/2009 | Supino | G11B 5/5582 360/77.14 |
| 2013/0250451 A1 * | 9/2013 | Huang | G11B 19/042 |

\* cited by examiner

*Primary Examiner* — Peter Vincent Agustin

(74) *Attorney, Agent, or Firm* — Faegre Drinker Biddle & Reath LLP

(57) ABSTRACT

A method includes generating a first feedforward signal based, at least in part, on a sensor signal. The method further includes generating a second feedforward signal based, at least in part, on a feedforward seek table. A control signal is modified based, at least in part, on the first feedforward signal and the second feedforward signal. A position of an actuator is controlled in response to the modified control signal.

20 Claims, 7 Drawing Sheets

| A (Packard Time-Distribution matrix) | | | | | | | X (FF) | | Y (PES) |
|---|---|---|---|---|---|---|---|---|---|
| r0 |    |    |    |    |    | | x0 | | y0 |
| r1 | r0 |    |    |    |    | | x1 | | y1 |
| r2 | r1 | r0 |    |    |    | | x2 | | y2 |
|    | r2 | r1 | r0 |    |    | | x3 | | y3 |
|    |    | r2 | r1 | r0 |    | | x4 | | y4 |
|    |    |    | r2 | r1 | r0 | | x5 | | y5 |

Y = X * A (with * between A and X, = between X and Y as shown)

FIG. 5

SEEK-INDUCED VIBRATION COMPENSATION

SUMMARY

In certain embodiments, a method includes generating a first feedforward signal based, at least in part, on a sensor signal. The method further includes generating a second feedforward signal based, at least in part, on a feedforward seek table. A control signal is modified based, at least in part, on the first feedforward signal and the second feedforward signal. A position of an actuator is controlled in response to the modified control signal.

In certain embodiments, a system on a chip includes an integrated circuit comprising memory and a processor. The memory contains instructions that, when executed by the processor, cause the processor to: generate a first feedforward signal based, at least in part, on a sensor signal; generate a second feedforward signal based, at least in part, on a feedforward seek table; modify a control signal based, at least in part, on the first feedforward signal and the second feedforward signal; and control a position of an actuator in response to the modified control signal.

In certain embodiments, a hard disk drive includes a voice coil motor assembly arranged to pivot an actuator. The hard disk drive further includes an integrated circuit configured to control a position of the actuator based, at least in part, on two separate feedforward signals.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

BRIEF DESCRIPTION OF THE DRAWINGS

FIG. 5 shows a representation of matrices, in accordance with certain embodiments of the present disclosure.

Figure 1:
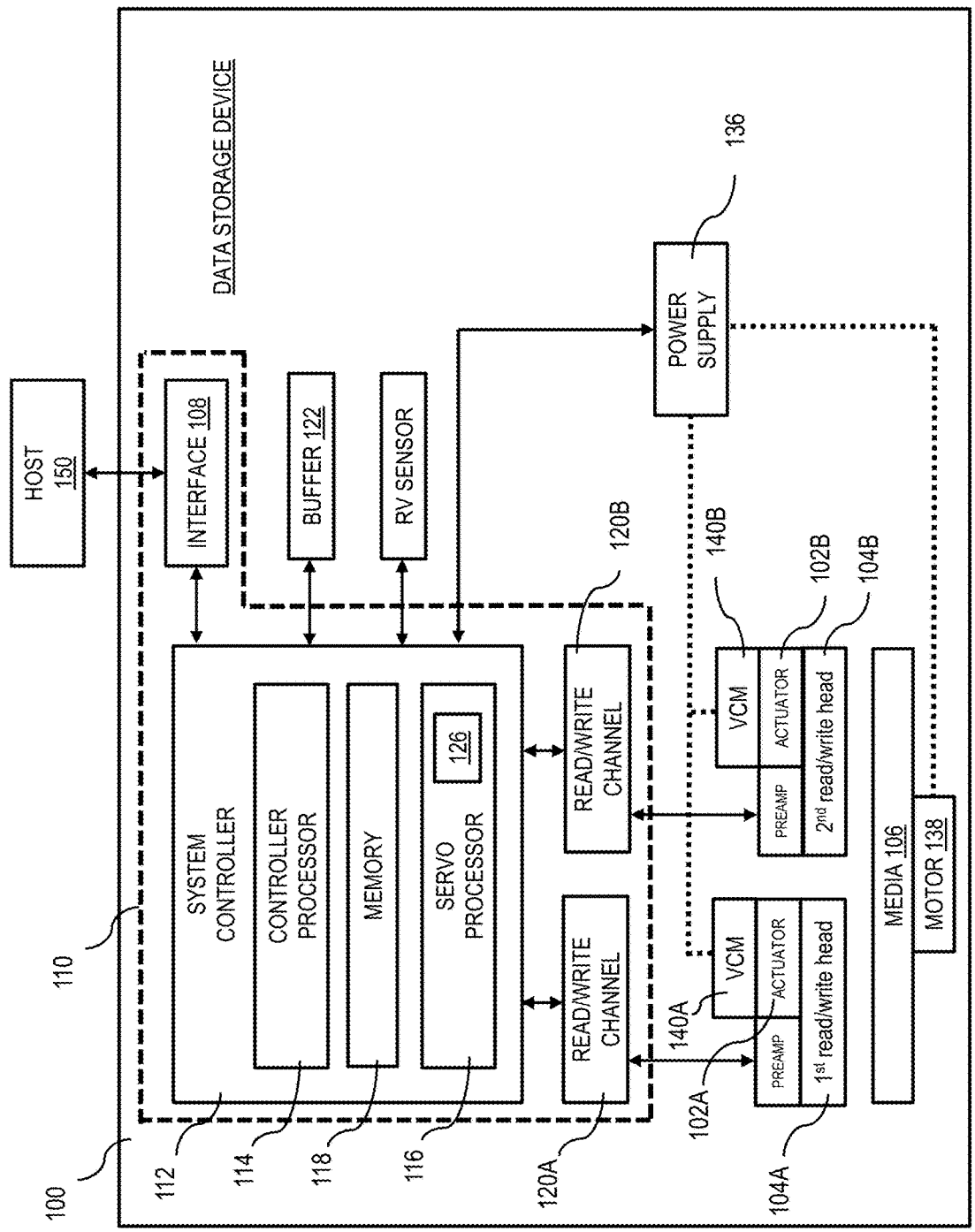
FIG. 1 shows a block diagram of a data storage device, in accordance with certain embodiments of the present disclosure.

While the disclosure is amenable to various modifications and alternative forms, specific embodiments have been shown by way of example in the drawings and are described in detail below. The intention, however, is not to limit the disclosure to the particular embodiments described but instead is intended to cover all modifications, equivalents, and alternatives falling within the scope of the appended claims.

DETAILED DESCRIPTION

Data storage devices such as hard disk drives use control systems to position actuators so that read/write heads coupled to the actuators and microactuators are positioned above desired tracks for carrying out reading and writing operations. For example, control systems may manage the amount of current or voltage supplied from a power supply to voice coil motor (VCM) assemblies and microactuators. The power supply may alter an amount of current or voltage such that vibration is compensated for. Left uncompensated, vibration can alter the ability of the VCM assemblies and microactuators to accurately position the read/write heads and, therefore, make it difficult for hard disk drives to read and write data from and to magnetic recording media.

Some vibration is caused by external sources (e.g., fans in enclosures, adjacent hard disk drives) and some vibration is caused by internal sources (e.g., when actuators are repeatedly moving back and forth quickly during sequential random read/write operations). To compensate for external sources of vibration, hard disk drives can use sensors to detect vibration so that the detected vibration can be compensated for by the control system. However, this approach is less effective for vibration caused by internal sources. Certain embodiments of the present disclosure are accordingly directed to methods and devices for compensating for internal sources of vibration. In particular, certain embodiments calibrate feedforward seek tables over time in view of prior vibration compensation performance.

DATA STORAGE DEVICES

FIG. 1 shows a schematic of a data storage device 100 such as a hard disk drive. In the case of a hard disk drive, the data storage device 100 can include multiple actuators (i.e., a first actuator 102A and a second actuator 102B) each with one or more read/write heads 104A and 104B to provide concurrent access to magnetic recording media 106 (e.g., magnetic recording disks, which are referred to as a magnetic recording medium in singular form). In certain embodiments, the multiple actuators 102A and 102B share a common pivot axis and are positioned in a stacked arrangement. In such embodiments, the read/write head(s) 104A coupled to the first actuator 102A access different surfaces of the magnetic recording media 106 than the read/write head(s) 104B coupled to the second actuator 102B. In other embodiments, the multiple actuators 102A and 102B have separate pivot axes. In such embodiments, the read/write head(s) 104A coupled to the first actuator 102A can access the same magnetic recording medium 106 as the read/write head(s) 104B coupled to the second actuator 102B. Although only two actuators for the data storage device 100 are shown in FIG. 1, additional actuators can be incorporated into the data storage device 100 or the data storage device 100 may have only one actuator.

The data storage device 100 includes an interface 108 (e.g., an input/output interface) for transferring data to and from the data storage device 100. For example, the interface 108, among other features, can be communicatively coupled between a host 150 (e.g., a laptop or a data storage system such as a server) and the read/write heads 104A and 104B to facilitate communication, using a standardized communication protocol (e.g., SATA, SAS, SCSI), between the read/write heads 104A and 104B and the host 150.

The data storage device 100 can include a system on a chip ("SOC") 110 (shown in dashed lines) that includes a system controller 112, which can include a controller processor 114 (e.g., a microprocessor), a servo processor 116 (e.g., a microprocessor), and memory 118 coupled to the controller processor 114 and the servo processor 116. The SOC 110 can include multiple distinct banks of memory. For example, one bank of memory 118 can be dedicated to the controller processor 114 and its functions while another bank of memory 118 can be dedicated to the servo processor 116 and its functions (e.g., the memory 118 and the servo processor 116 together functioning as a servo controller). The interface 108 may also be part of the SOC 110.

The SOC 110 can also include one or more read/write channels 120A and 120B, which encode data associated with write commands and with read commands. The SOC 110 may be an integrated circuit such as an application-specific integrated circuit ("ASIC") and field-programmable gate array ("FPGA") that includes instructions (e.g., in the form of firmware) for carrying out various functions of the data storage device 100. For example, the SOC 110 can include circuitry to control and carry out various aspects of the data storage device 100 as described in more detail below. Although the interface 108, system controller 112, etc., are shown as being part of a single SOC, the components and their functions can be distributed among several integrated circuits. The system controller 112 can be coupled to and control access to a buffer 122, which can temporarily store data associated with read commands and write commands. The buffer 122 can be a volatile memory, such as a dynamic random access memory ("DRAM"), static random access memory ("SRAM"), or other volatile memory.

During operation, the data storage device 100 receives various data transfer commands (e.g., a read command or a write command) from the host 150. Data associated with a write command may be received from the host 150 by the interface 108 and initially stored to the buffer 122. The data is encoded or otherwise processed by respective read/write channels 120A or 120B and eventually stored to the magnetic recording media 106 via one of the read/write heads 104A or 104B coupled to the respective first actuator 102A or the second actuator 102B. Data associated with a read command may be retrieved from the magnetic recording media 106 and stored in the buffer 122. Such data is then transferred to the host 150 by the interface 108.

SERVO CONTROL SYSTEM

The data storage device 100 includes a servo control system 126 (schematically shown FIG. 2) that is carried out by components of the system controller 112 (e.g., the servo processor 116 and one or more banks of the memory 118). In operation, the read/write heads 104A and 104B read the positioning data from servo sectors stored on the magnetic recording media 106. The read positioning data is processed to determine an actual position 128 (shown in FIG. 2) of the read/write heads 104A and 104B relative to tracks on the magnetic recording media 106. The actual position 128 of the read/write heads 104A and 104B is subtracted from a desired position 130 of the read/write heads 104A and 104B to determine a position error signal (PES) 132, which is the difference between where the read/write heads 104A and 104B are and should be positioned. The PES 132 is fed into one or more feedback controllers 134, which control current to at least one of the VCM assemblies 140A, 140B and—for some operations—controls voltage to microactuators to position the read/write heads 104A and 104B over the desired track.

As shown in FIG. 1, the data storage device 100 includes a power supply 136, (e.g., an amplifier) which is controlled by the system controller 112. The power supply 136 supplies current to a motor 138 (e.g., spindle motor), which rotates the magnetic recording media 106. The power supply 136 also supplies current to VCM assemblies 140A and 140B. In certain embodiments, the power supply 136 is an integrated circuit, which includes electronics (e.g., voice coil driver electronics) designed to provide current to the VCM assemblies 140A and 140B.

The VCM assemblies 140A and 140B are used to position (e.g., rotate) the actuators 102A and 102B to position the read/write heads 104A and 104B over a desired data track on the magnetic recording media 106 for data reading and data writing operations. For example, in response to a command to read data from or write data to a data track located a certain distance away from where a respective read/write head 104A or 104B is currently positioned (i.e., a track-seeking operation), a current may be supplied by the power supply 136 and applied to the voice coil of the respective VCM assemblies 140A and 140B to rotate the respective actuators 102A and 102B (and therefore the respective read/write heads 104A and 104B) towards the desired data track. The applied current through the coil generates a magnetic field that interacts with magnets of the VCM assemblies 140A and 140B. The applied current may follow a current profile determined by and commanded by the servo processor 116. As the respective read/write heads 104A and 104B near the desired data track, less current is applied to the VCM assemblies 140A and 140B such that the read/write heads 104A and 104B begin to settle over the desired data track (i.e., a track-settling operation). Once the respective read/write heads 104A and 104B are positioned over the desired data track, the servo control system 126 compensates for small positioning errors (i.e., a track-follow operation) to keep the desired read/write heads 104A and 104B over the desired data tracks on the magnetic recording medium 106 during a read operation or a write operation.

APPROACHES FOR COMPENSATING FOR SEEK-INDUCED VIBRATION

As noted above, one internal source of vibration is realized when actuators are seeking and, in particular, when actuators are repeatedly moving back and forth quickly during sequential random read/write operations. It can be challenging to compensate for such internal sources of vibration. However, over time, a data storage device can calibrate itself based on prior vibration-compensation performance.

Figure 3:
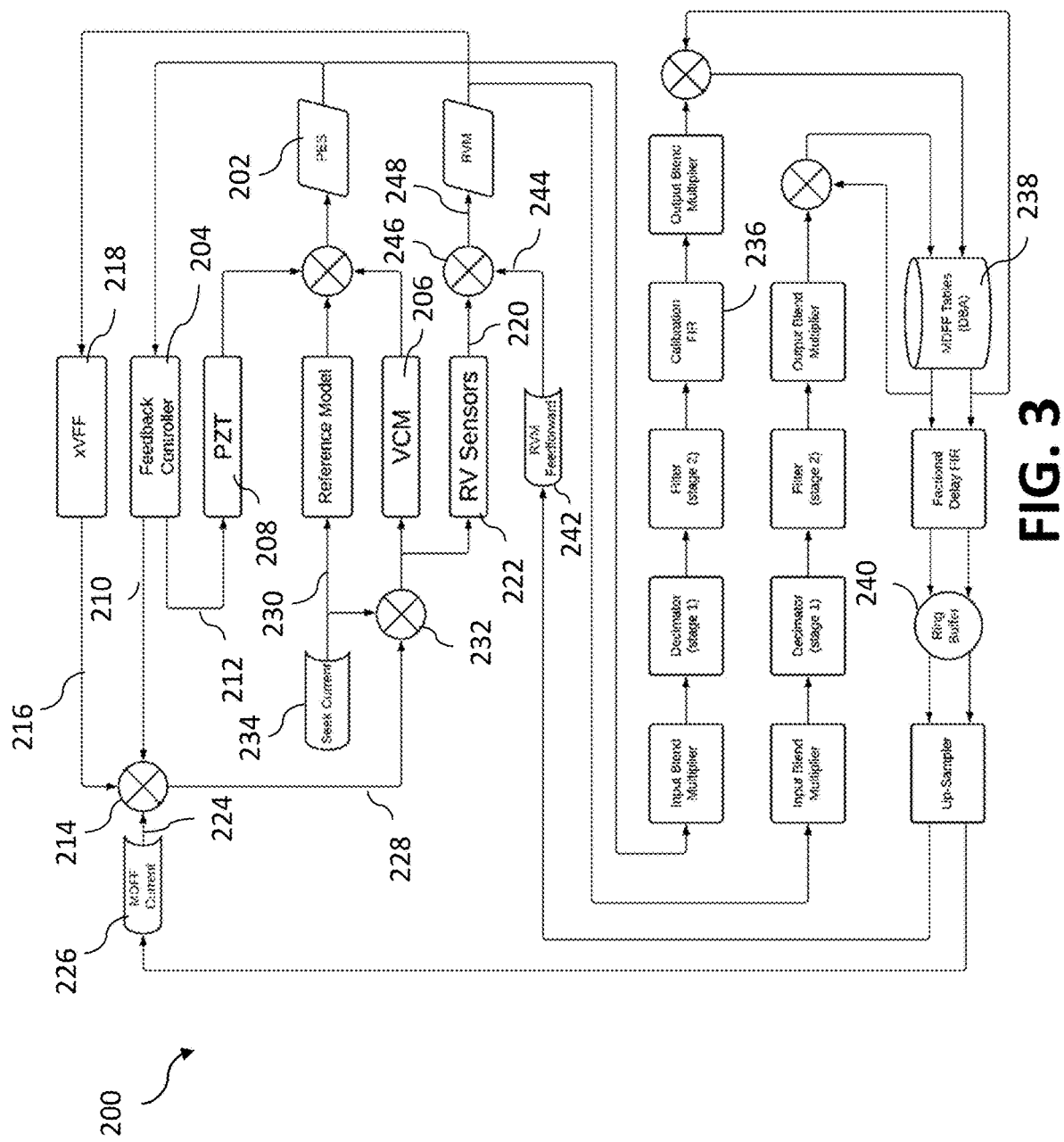
FIG. 3 shows a more detailed diagram of a servo control system, in accordance with certain embodiments of the present disclosure.

FIG. 3 shows a diagram of a servo control system 200, which can be utilized in the data storage device 100 of FIG. 1.

Figure 2:
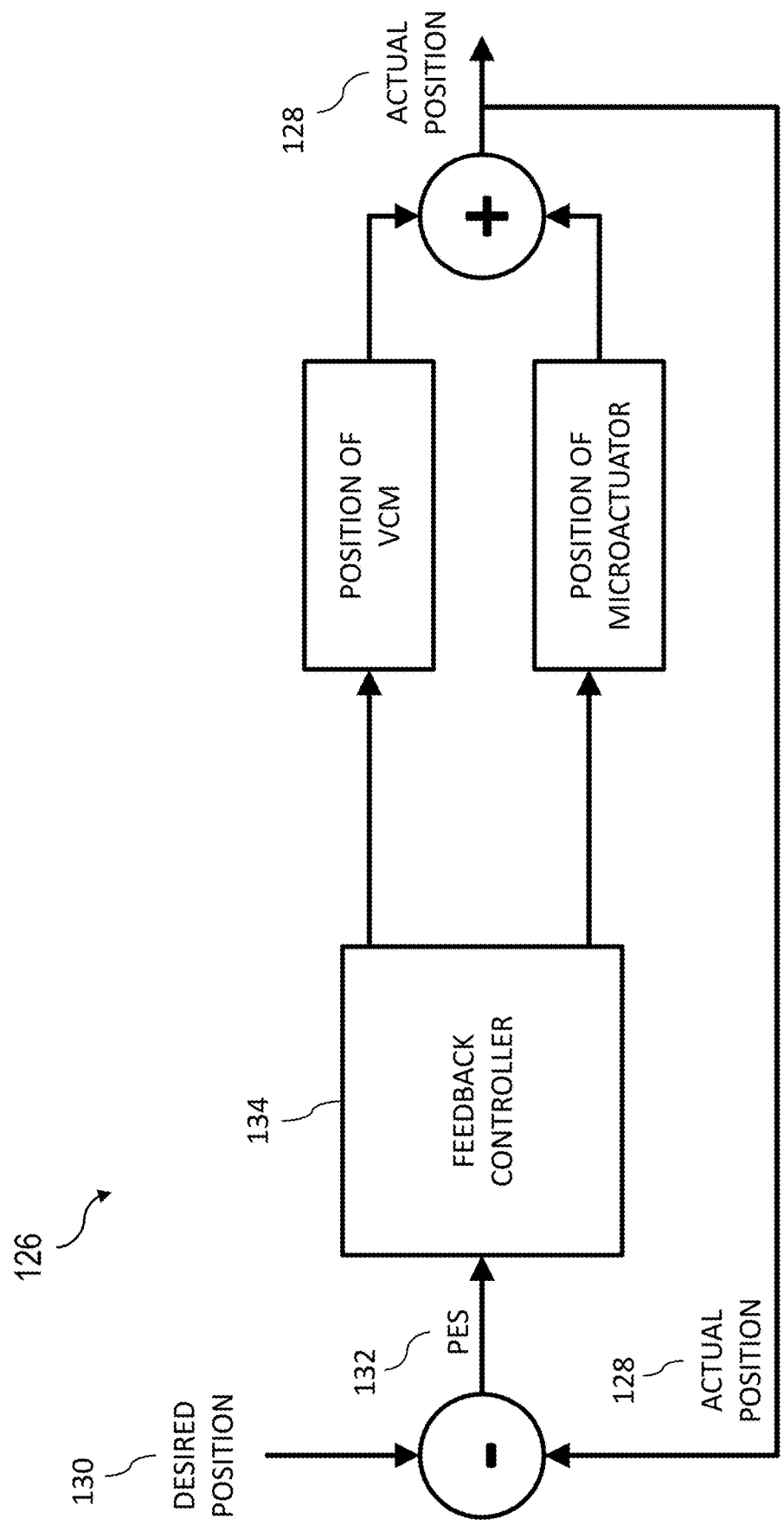
FIG. 2 shows a diagram of a servo control system, in accordance with certain embodiments of the present disclosure.

Like the servo control system of FIG. 2, the servo control system 200 shown in FIG. 3 uses PES 202 as an input to one or more feedback controllers 204, which control current to the VCM assembly 206 and—for some operations—controls voltage to microactuators 208 (labeled as PZT in FIG. 3) to position read/write heads over the desired track. For example, the PES 202 is injected into the feedback controller 204, which generates a VCM control signal 210 that assists with controlling current applied to a voice coil used to rotate the actuator. The feedback controller 204 also may generate a microactuator control 212 signal that assists with controlling voltage applied to the microactuator (e.g., PZT elements of the microactuator) for pivoting the read/write heads.

The VCM control signal 210 can be modified by various feedforward compensation signals. At summing node 214, the VCM control signal 210 is first modified by a rotational vibration (RV) feedforward signal 216 generated by an RV feedforward module 218 (labeled as xVFF in FIG. 3). The RV feedforward module 218 generates the RV feedforward signal 216 based at least in part on RV sensor signals 220 generated by RV sensors 222 positioned on the data storage device 100. At summing node 214, the VCM control signal 210 is further modified by a position feedforward signal 224, which is a feedforward seek current generated by a position feedforward module 226 (described in more detail below). In response to the VCM control signal 210 being modified by the two feedforward signals 216 and 224, a modified VCM control signal 228 is generated. The modified VCM control signal 228 is combined with seek current 230 at summing node 232 to generate a signal to control the VCM assembly 206 to position the actuator and read/write heads over desired data tracks.

The position feedforward module 226 generates the position feedforward signal 224 based on prior vibration compensation performance of the data storage device. In particular, prior vibration compensation performance is used to create calibrated feedforward seek tables. These feedforward seek tables can be unique for each individual data storage device because the feedforward seek tables are based on a data storage device's own performance. To help explain an example of how this is accomplished, FIG. 4 outlines an exemplary process 300.

First, a VCM pulse is measured (block 302 in FIG. 4) to begin calibrating feedforward seek tables (described in more detail below). As such, this VCM pulse may be used solely for calibration and not for carrying out a write operation or read operation. However, this VCM pulse may be first initiated once the data storage device has been installed in a host system in the field (e.g., installed in a server after having been shipped from the manufacturing factory). In other embodiments, the VCM pulse response is measured in the factory (e.g., via bench testing of the data storage device).

The VCM pulse response is measured by R(k):

$$R(k)=[r0, r1, r2, \ldots, rn]$$

Figure 4:
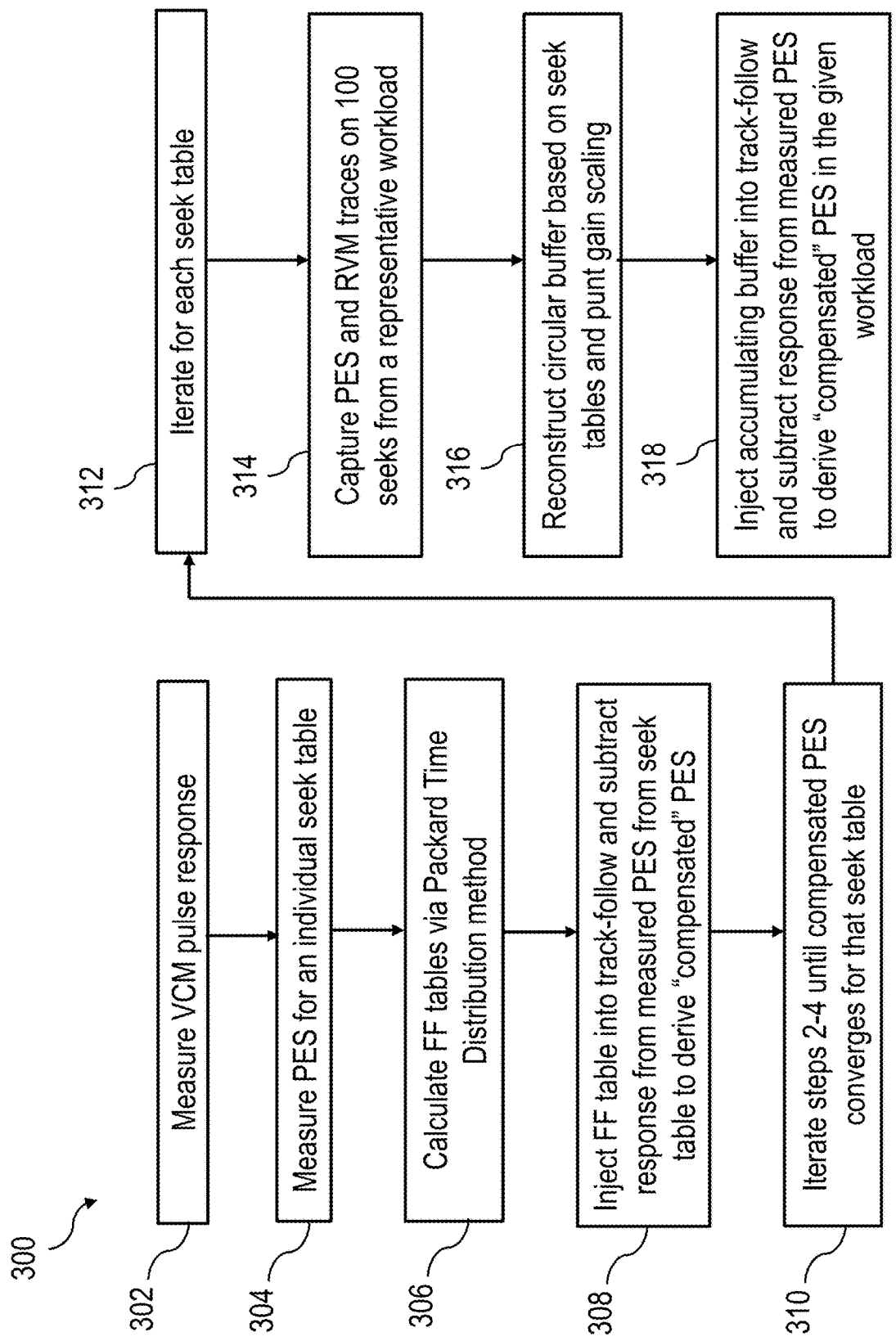
FIG. 4 shows a block diagram of steps of a method, in accordance with certain embodiments of the present disclosure.

Next, the PES 202 is measured for an individual seek table (block 304 in FIG. 4). A data storage device may store around a hundred to a couple hundred seek tables 234. These seek tables provide a current profile (e.g., levels of current over time) used to accomplish a given track seek operation. For example, each seek table may be associated with a given range of seek lengths. One seek table may be used for track seek operations that seek 2,000-3,000 data tracks (e.g., moving from one data track to another that is 2,000 to 3,000 data tracks away from each other), while another seek table may be used for track seek operations that seek 10,000-11,000 data tracks away, and so on. Some seek tables may be solely for write operations and others may be solely used for read operations.

The measured PES 202 is then converted to a feedforward current using what is referred to as Packard Time Distribution matrix. An example matrix 400 is shown in FIG. 5 and further labeled (and referred to herein) as matrix A. Because inputs to linear systems can be superimposed in time, the product of matrix A and a feedforward input vector X will yield PES compensation. The feedforward current will then be:

$$X=\text{inv}(A)\ Y$$

Because matrix A is a lower-triangular matrix, matrix A can be solved by forward-substitution. Further, by taking advantage of the repeating structure of the rows and columns, incremented indexes of the feedforward seek table can be solved recursively. As such, a feedforward seek table can be calculated using the Packard Time Distribution method (block 306 in FIG. 4). In certain embodiments, due to noise in PES measurements, the feedforward seek table is iterated rather than solving the feedforward table in a single pass. This iterative solving can be accomplished with varying update gains. In certain embodiments, the Packard Time Distribution method can be formulated as a FIR filter 236 of FIG. 3 to convert PES to feedforward current. In the servo control system 200 of FIG. 3, the feedforward seek tables are represented by element 240 and are stored to memory of the data storage device.

Next, the calculated feedforward seek table is used as part of seek operations and/or track follow operations and the effect on PES is measured to generate a "compensated" PES (block 308 in FIG. 4). The steps of blocks 304-308 are then repeated until the compensated PES converges for the given seek table 234 (block 310 in FIG. 4). The steps of blocks 302-310 can then be repeated for each seek table 234 (block 312 in FIG. 4).

As such, once the process is carried out for each seek table 234, there will be one feedforward seek table for each seek table 234. Because the feedforward seek tables 238 are based on prior vibration compensation performance (which is affected by seek-induced vibration), the feedforward seek tables 238 help compensate for seek-induced vibration. A given feedforward seek table 238 can then be used to generate the position feedforward signal 224 when its associated seek table 234 is used. In certain embodiments, the feedforward seek tables 238 are only used in connection with seek tables 234 used for write operations, as opposed for seek tables used for read operations.

Before describing the remaining steps of FIG. 4, the concept of a circular buffer will be introduced. A circular buffer is represented by element 240 (denoted as a ring buffer) in FIG. 3.

Figure 6:
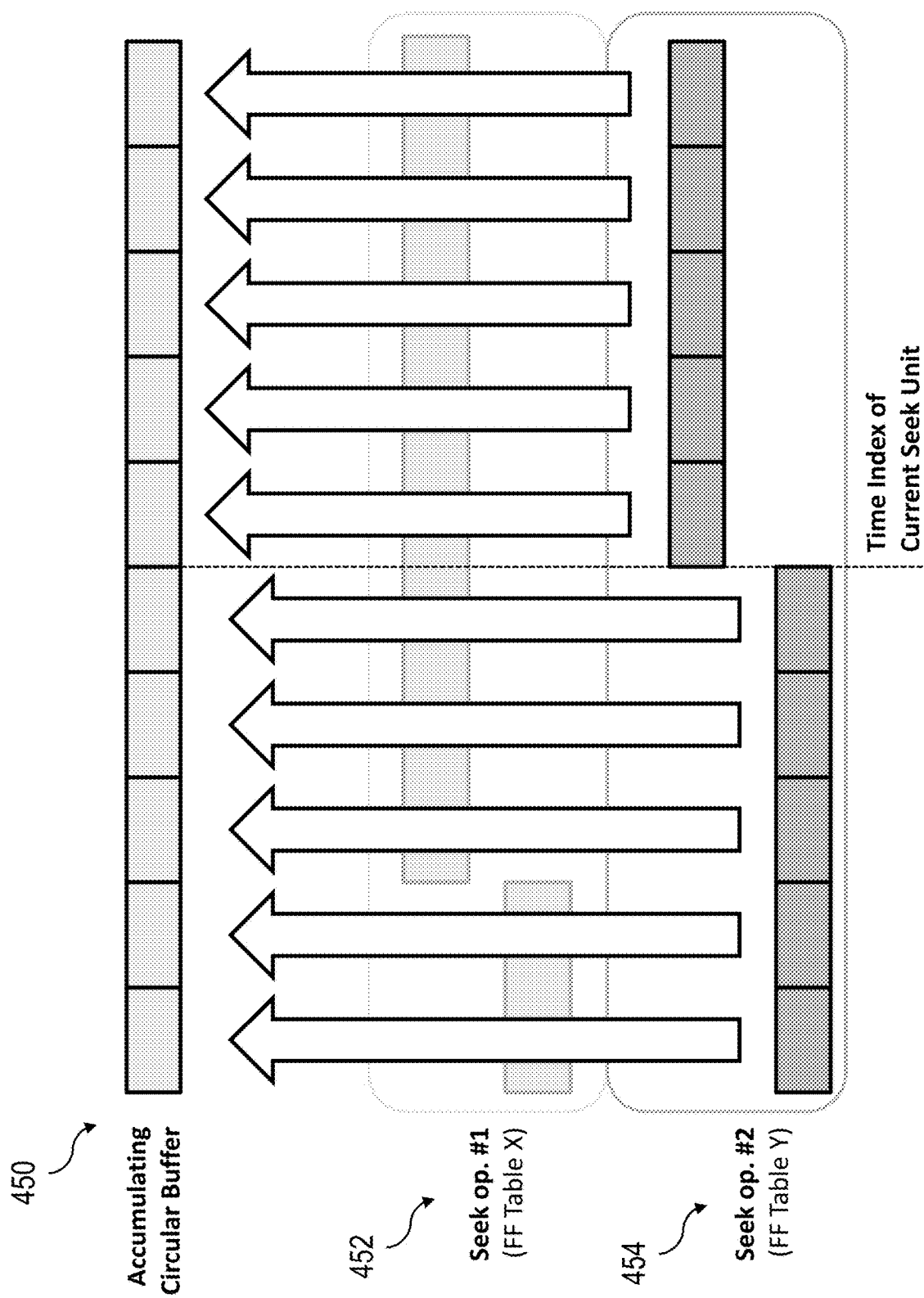
FIG. 6 shows a block representation of an accumulating feedforward buffer, in accordance with certain embodiments of the present disclosure.

A more detailed diagram of a circular buffer 450 is shown in FIG. 6. The circular buffer 450 helps address the fact that vibration induced from a given seek can continue to affect positioning of the read/write heads after the seek has been completed and, therefore, can affect subsequent seek operations.

In short, the circular buffer 450 sums time responses from multiple seek operations. Because the time responses of each seek operation can be superimposed on top of one another, the time responses can be summed together. As such, the circular buffer 450 can be considered to be an accumulating feedforward buffer. With the circular buffer 450, although there is a finite time horizon for individual seek operation, the circular buffer 450 can continue indefinitely so long as there are additional seek operations to compensate.

The circular buffer 450 can be used in combination with seek operations that use different seek tables. Put another way, the time responses from seek operations of differing seek lengths can be summed using the circular buffer 450. In the diagram of FIG. 6, an initial seek operation 452 uses a first feedforward seek (table X) while a subsequent seek operation 454 uses a second feedforward seek (table Y).

Referring back to the process 300 of FIG. 4, PES and RV sensor measurements are recorded from seek operations from a representative workload (block 314 in FIG. 4). In certain embodiments, the number of seek operations used is pre-determined and can range from 50-300 individual seeks (e.g., 100 seeks). These measurements can be taken to identify vibration-related patterns for given types of workloads.

The feedforward seek tables 238 can then be updated to better compensate for vibration under the recorded workloads. In particular, the circular buffer 450 can be reconstructed based on seek tables used during the representative workload and punt gain scaling (block 316 in FIG. 4). The results of the circular buffer 450 is used as part of a track follow operation and the effect on PES is measured to generate a "compensated" PES for the given workload (block 318 in FIG. 4).

Referring back to FIG. 3, the various calculated feedforward tables 238 can be used as inputs to the position feedforward module 226 to generate the position feedforward signal 224. Further, the various calculated feedforward tables 238 can be used as inputs to a RV feedforward module 242. The RV feedforward module 242 generates an RV feedforward signal 244 that is combined with the RV sensor signal 220 at summing node 246 to create a modified RV sensor signal 248, which is ultimately used by the RV feedforward module 218.

Although the servo control system 200 of FIG. 3 shows various RV compensation components, in certain embodiments, the servo control system 200 can forgo the RV compensation components. For example, the process of creating and using the feedforward tables can be used in data storage devices that do not include RV sensors. Such data storage devices may be types used in low vibration environments (e.g., surveillance environments). As such, the feedforward tables can be used to compensate for vibration without the use of RV sensors on the data storage device.

Figure 7:
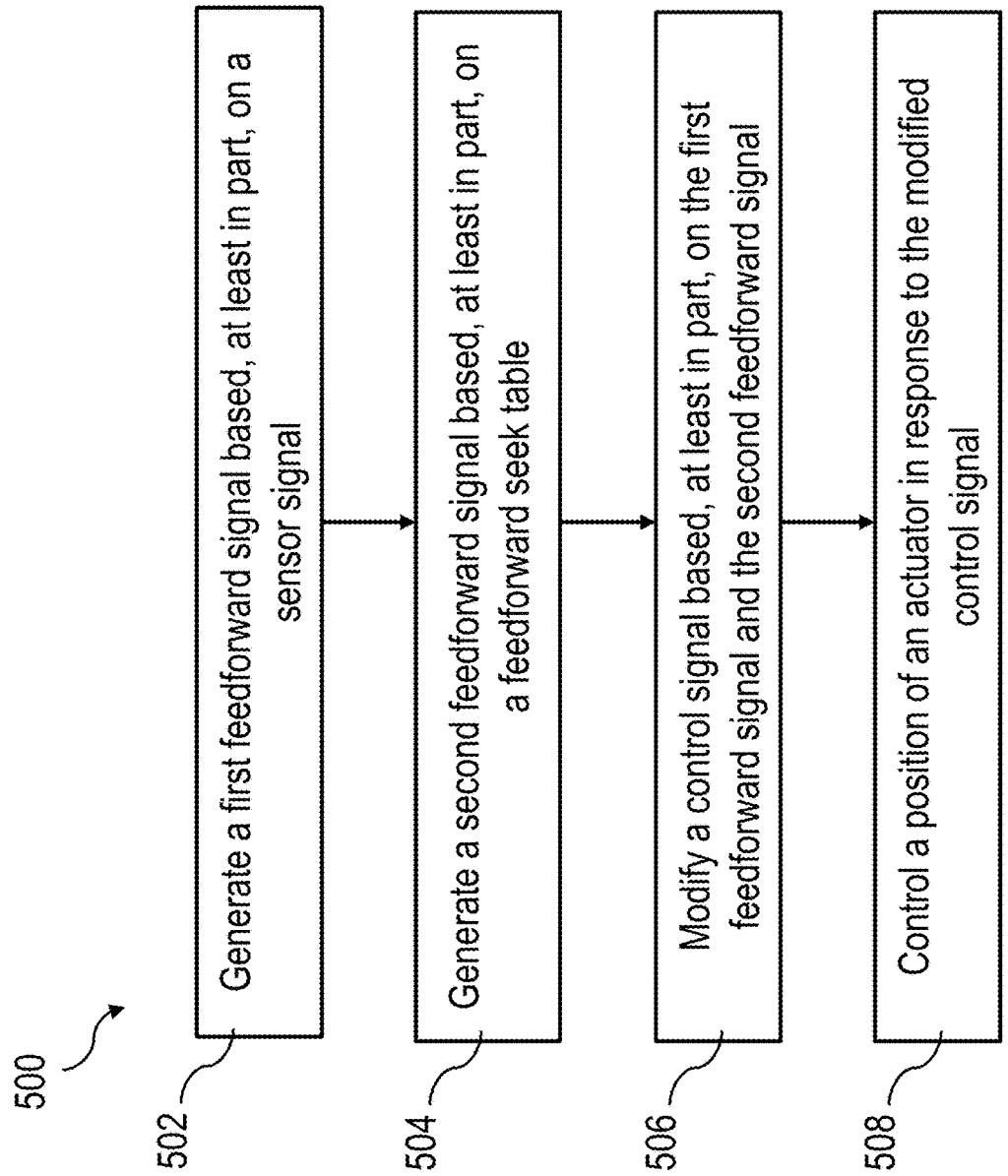
FIG. 7 shows a block diagram of steps of a method, in accordance with certain embodiments of the present disclosure.

FIG. 7 shows a method 500 for using feedforward seek tables generated by the process 300 of FIG. 4. The method 500 includes generating a first feedforward signal based, at least in part, on a sensor signal (block 502 in FIG. 7). The method 500 further includes generating a second feedforward signal based, at least in part, on a feedforward seek table (block 504 in FIG. 7). The method 500 further includes modifying a control signal based, at least in part, on the first feedforward signal and the second feedforward signal (block 506 in FIG. 7). The method 500 further includes controlling a position of an actuator in response to the modified control signal (block 508 in FIG. 7).

Aspects of the present disclosure are described with reference to flowchart illustrations and/or block diagrams of methods, devices, systems and computer program products. It will be understood that each block of the flowchart illustrations and/or block diagrams, and combinations of blocks in the flowchart illustrations and/or block diagrams, can be implemented by computer program instructions stored to memory. In instances, the memory includes computer-readable media in the form of volatile and/or nonvolatile memory and may be removable, nonremovable, or a combination thereof. In instances, the memory stores computer-executable instructions for causing a processor (e.g., microprocessor) to implement aspects of instances of components discussed herein and/or to perform aspects of instances of methods and procedures discussed herein. The memory can comprise a non-transitory computer readable medium storing the computer-executable instructions. The computer-executable instructions may include, for example, computer code, machine-useable instructions, and the like such as, for example, program components capable of being executed by one or more processors. Program components may be programmed using any number of different programming environments, including various languages, development kits, frameworks, and/or the like. Some or all of the functionality contemplated herein may also, or alternatively, be implemented in hardware and/or firmware. According to instances, for example, the instructions may be configured to be executed by the processor(s) and, upon execution, to cause the processor to perform certain processes. In certain instances, the processor, memory, and instructions are part of a controller such as an application specific integrated circuit (ASIC), field-programmable gate array (FPGA), and/or the like. Such devices can be used to carry out the functions and steps described herein.

Various modifications and additions can be made to the embodiments disclosed without departing from the scope of this disclosure. For example, while the embodiments described above refer to particular features, the scope of this disclosure also includes embodiments having different combinations of features and embodiments that do not include all of the described features. Accordingly, the scope of the present disclosure is intended to include all such alternatives, modifications, and variations as falling within the scope of the claims, together with all equivalents thereof.

We claim:

1. A method comprising:
generating a first feedforward signal based, at least in part, on a sensor signal and a feedforward seek table;
generating a second feedforward signal based, at least in part, on the feedforward seek table;
modifying a control signal based, at least in part, on the first feedforward signal and the second feedforward signal; and
controlling a position of an actuator in response to the modified control signal.

2. The method of claim 1, wherein the sensor signal is a rotational vibration (RV) signal generated by an RV sensor.

3. The method of claim 2, further comprising: generating a modified RV sensor signal based, at least in part, on the feedforward seek table.

4. The method of claim 3, wherein the generating the first feedforward signal is based, at least in part, on the modified RV sensor signal.

5. The method of claim 1, wherein the feedforward seek table is generated by a process comprising:
measuring a position error signal during a seek operation of the actuator; and
converting the position error signal to a feedforward current.

6. The method of claim 5, wherein the converting the position error signal comprises solving a matrix.

7. The method of claim 6, wherein the matrix is a Packard Time Distribution matrix.

8. The method of claim 5, wherein the converting the position error signal includes applying a finite impulse response (FIR) filter to the position error signal.

9. The method of claim 1, wherein the feedforward table is selected based on a seek length.

10. The method of claim 1, further comprising:
summing time responses of multiple seek operations in a circular buffer.

11. The method of claim 1, wherein the second feedforward signal is derived from position error caused by seek-induced vibration.

12. A system on a chip (SOC) comprising:
an integrated circuit comprising memory and a processor, the memory containing instructions that, when executed by the processor, cause the processor to:
generate a first feedforward signal based, at least in part, on a sensor signal and a feedforward seek table;

generate a second feedforward signal based, at least in part, on the feedforward seek table;
modify a control signal based, at least in part, on the first feedforward signal and the second feedforward signal; and
control a position of an actuator in response to the modified control signal.

13. The SOC of claim 12, wherein the sensor signal is a rotational vibration (RV) signal generated by an RV sensor.

14. The SOC of claim 13, wherein the instructions, when executed by the processor, cause the processor to: generate a modified RV sensor signal based, at least in part, on the feedforward seek table.

15. The SOC of claim 12, wherein the instructions, when executed by the processor, cause the processor to: sum time responses of multiple seek operations in a circular buffer.

16. The SOC of claim 12, wherein the second feedforward signal is derived from position error caused by seek-induced vibration.

17. A hard disk drive comprising:
a voice coil motor assembly arranged to pivot an actuator; and
an integrated circuit configured to control a position of the actuator based, at least in part, on two separate feedforward signals and a feedback signal, wherein the two separate feedforward signals and the feedback signal are combined together at a summing node.

18. The hard disk drive of claim 17, further comprising: memory storing a set of feedforward seek tables, wherein both of the two feedforward signals are based, at least in part, on a feedforward seek table selected from the set.

19. The hard disk drive of claim 18, wherein the selected feedforward seek table is selected based on a seek length.

20. The hard disk drive of claim 18, further comprising a rotational vibration sensor, wherein one of the two feedforward signals is further based, at least in part, on a sensor signal generated by the rotational vibration sensor.

* * * * *